(12) United States Patent
Yuzawa et al.

(10) Patent No.: US 7,833,458 B2
(45) Date of Patent: Nov. 16, 2010

(54) IMPRINTING METHOD AND STAMPER

(75) Inventors: Akiko Yuzawa, Yokohama (JP); Seiji Morita, Yokohama (JP); Shinobu Sugimura, Yokohama (JP); Masatoshi Sakurai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 42 days.

(21) Appl. No.: 12/413,366

(22) Filed: Mar. 27, 2009

(65) Prior Publication Data

US 2009/0243152 A1 Oct. 1, 2009

(30) Foreign Application Priority Data

Mar. 28, 2008 (JP) .............................. 2008-087763

(51) Int. Cl.
*B28B 7/10* (2006.01)
(52) U.S. Cl. .................. 264/293; 264/284; 264/334; 425/440
(58) Field of Classification Search .................. 264/313, 264/316, 571, 293, 319, 284, 334; 425/182, 425/186, 440, 470
See application file for complete search history.

(56) References Cited

U.S. PATENT DOCUMENTS

| | | | |
|---|---|---|---|
| 2004/0200368 A1 | 10/2004 | Ogino et al. | |
| 2005/0116387 A1* | 6/2005 | Davison et al. | 264/293 |
| 2007/0114686 A1* | 5/2007 | Choi et al. | 264/2.7 |
| 2008/0122144 A1* | 5/2008 | Zhang et al. | 264/571 |

FOREIGN PATENT DOCUMENTS

| | | |
|---|---|---|
| JP | 06-000876 | 1/1994 |
| JP | 2001-052378 | 2/2001 |
| JP | 2002-260307 | 9/2002 |
| JP | 2002-288895 | 10/2002 |
| JP | 2003-203402 | 7/2003 |
| JP | 2005-166241 | 6/2005 |
| JP | 2006-040488 | 2/2006 |
| JP | 2007-118552 | 5/2007 |
| JP | 2007-294076 | 11/2007 |
| JP | 2008-012858 | 1/2008 |
| JP | 2008-012859 | 1/2008 |
| JP | 2008-221552 | 9/2008 |
| WO | WO 2006/101235 A1 | 9/2006 |
| WO | WO 2006/106735 A1 | 10/2006 |

OTHER PUBLICATIONS

Final Notice of Rejection mailed by Japan Patent Office on Nov. 10, 2010 in the corresponding Japanese patent application No. 2008-087763.
Explanation of Non-English Language Reference(s).

* cited by examiner

*Primary Examiner*—Khanh Nguyen
*Assistant Examiner*—Saeed M Huda
(74) *Attorney, Agent, or Firm*—Knobbe, Martens, Olson & Bear LLP

(57) ABSTRACT

According to one embodiment, an imprinting method includes applying a resist to a substrate, imprinting a stamper on which protruded patterns are formed against the resist applied to the substrate, forcing a distal end of a peeling wedge into a part between the substrate and the stamper, and introducing a gas between the substrate and the stamper to peel off the stamper from the substrate, in which a gap between the substrate and the stamper is made larger than a thickness of the resist at a part into which the distal end of the peeling wedge is forced.

1 Claim, 5 Drawing Sheets

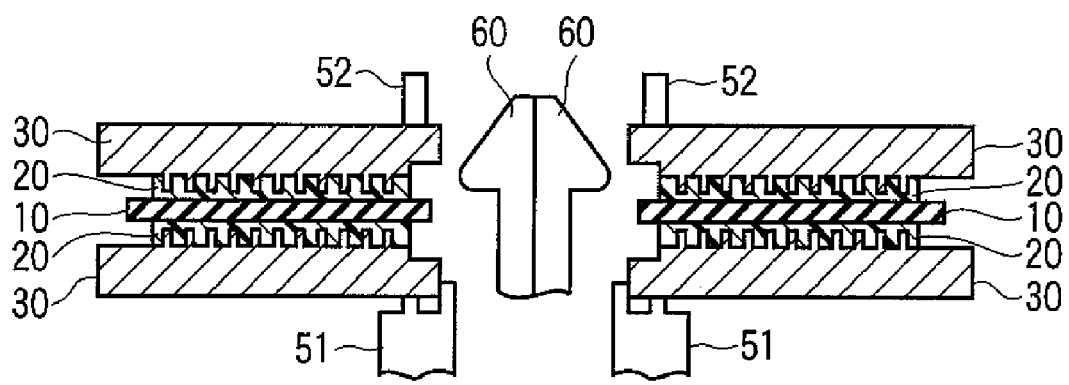
F I G. 1A
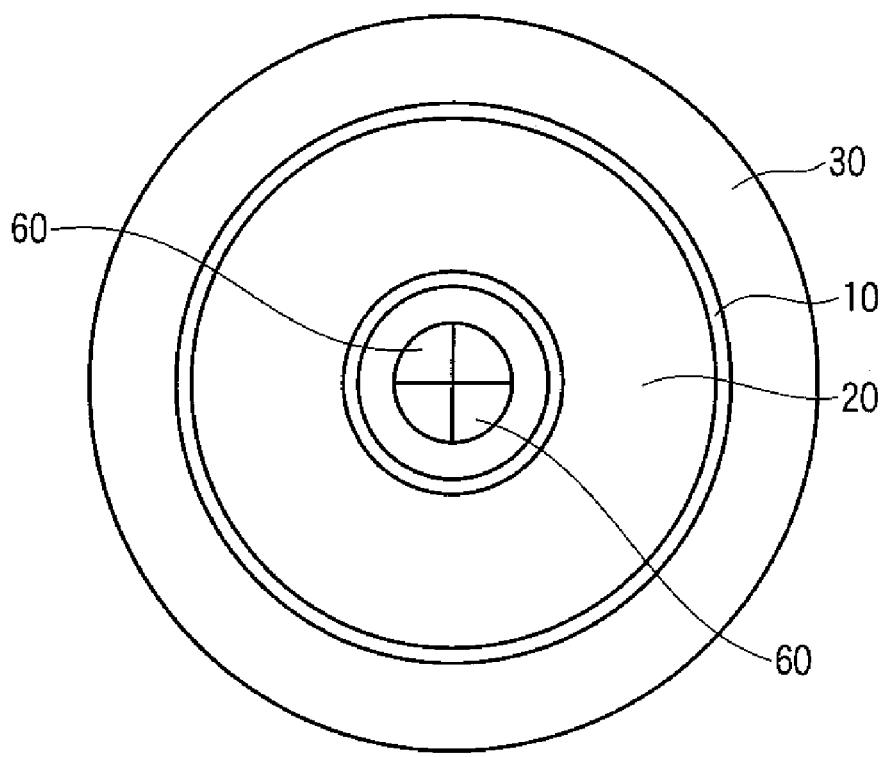
F I G. 1B

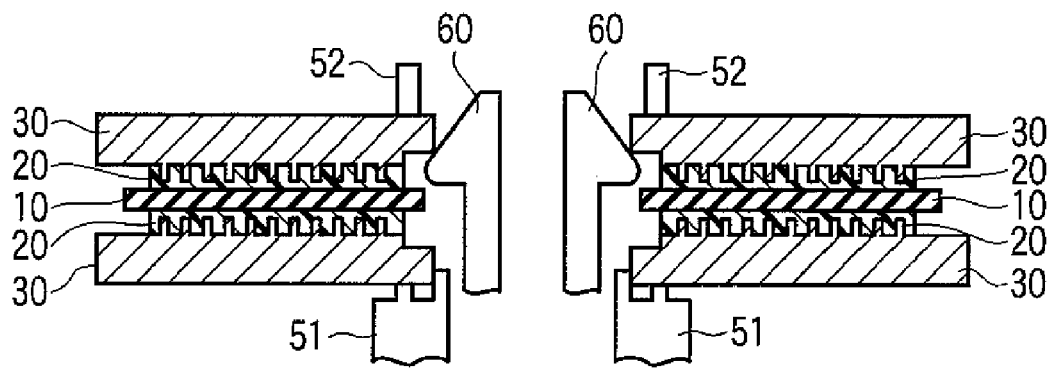
F I G. 2A
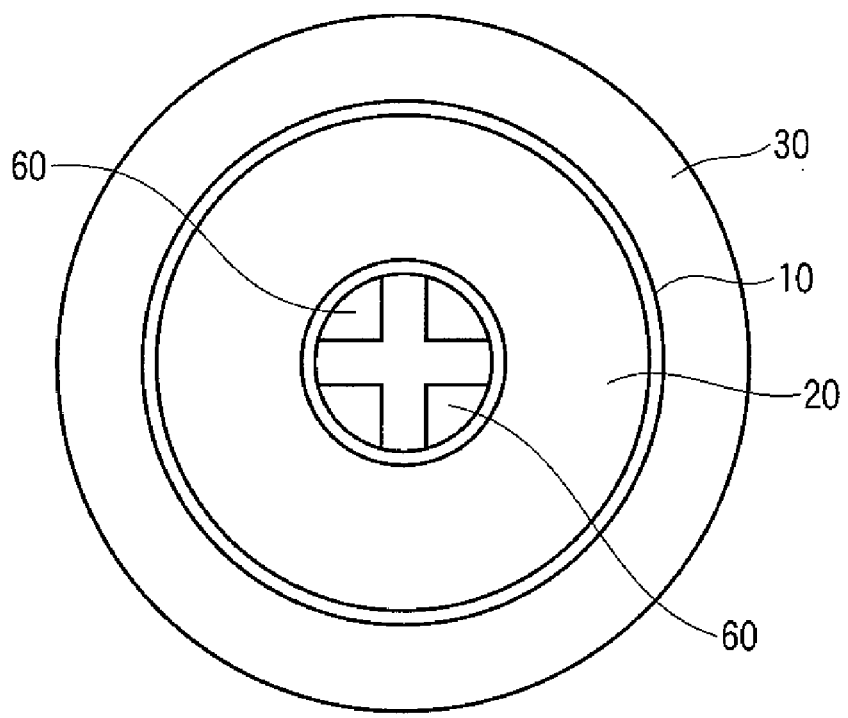
F I G. 2B

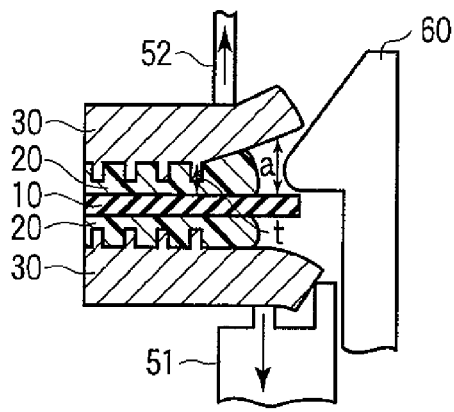
F I G. 4A
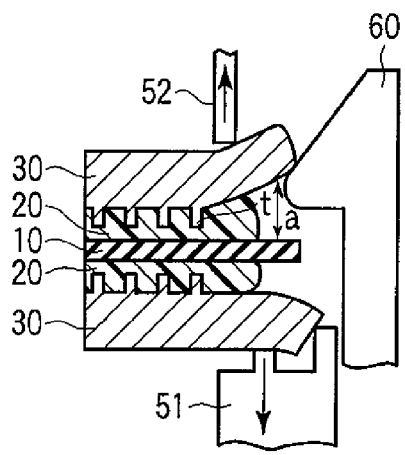
F I G. 4B
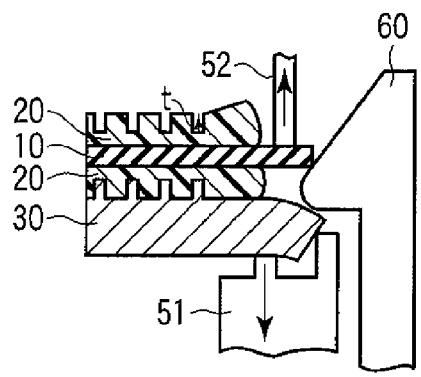
F I G. 4C
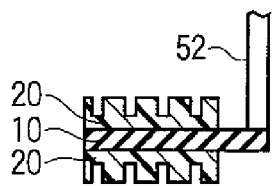
F I G. 4D

IMPRINTING METHOD AND STAMPER

CROSS-REFERENCE TO RELATED APPLICATIONS

This application is based upon and claims the benefit of priority from Japanese Patent Application No. 2008-087763, filed Mar. 28, 2008, the entire contents of which are incorporated herein by reference.

BACKGROUND

1. Field

One embodiment of the present invention relates to an imprinting method, and more particularly, to an imprinting method applied to the manufacture of a discrete track recording magnetic recording medium. Further, the present invention relates to a stamper used for the imprinting method.

2. Description of the Related Art

In recent years, in a manufacturing process of a semiconductor element or an information recording medium, formation of patterns microstructured to a nanometer size is required. As a method of forming a microstructure on a substrate, lithography such as ArF liquid immersion lithography and EUV lithography, and nanoimprint are proposed. The nanoimprint is a technique for transcribing micropatterns by pressing a stamper on which desired protruded patterns are formed against a resist applied to a substrate. Accordingly, nanoimprint is studied as a method advantageous in terms of cost and throughput to transcribe micropatterns on a large area.

As one of recording media requiring micropatterning as described above, there is known a discrete track recording magnetic recording medium (DTR medium).

Imprinting used in manufacturing a DTR medium will be described below. First, a resist is applied to both sides of a substrate. The substrate includes a glass substrate, a metallic substrate such as Si, a carbon substrate, and a resin substrate. The resist includes a thermosetting resin, an UV-curable resin, and a sol-gel material. The resist is applied by various methods such as the spin coating, dip coating, and an inkjet method. A thickness of the resist is set at 1 µm or less, and more preferably several hundred nm or less.

On the other hand, a stamper is prepared on a surface of which protruded micropatterns are formed. The material for the stamper includes Ni, Si, glass, quartz, and resin. On a stamper used for manufacturing, for example, a DTR medium, patterns corresponding to the recording tracks are formed with a track pitch of 100 nm or less.

Subsequently, each of protruded pattern surfaces of two stampers is opposed to the resist applied to each of both sides of the substrate from above and below, and is pressed against the resist, thereby transcribing the patterns of each of the stampers onto the resist. This step is performed in the following manner in accordance with the type of the resist. When the thermosetting resin is used as the resist, the stamper is pressed against the resist in a heated state, and then the resist is cooled, thereby transcribing the microstructures. When the UV-curable resin is used as the resist, in a state where the stamper is pressed against the resist, the resist is irradiated with UV-light through a transparent substrate, thereby transcribing the microstructures. When the sol-gel material is used as the resist, the microstructures are transcribed by pressing the stamper against the resist under high pressure. In this way, a structure formed by pressing the two stampers against both sides of the substrate with the resist layers sandwiched is obtained.

In order to form protruded patterns to be used as masks on the substrate, it is necessary to peel off the stamper from the resist. However, since the thickness of the resist is as thin as 1 µm or less, and the stampers are pressed against both sides of the substrate, it is difficult to peel off the stampers.

Conventionally, in order to manufacture an optical disk such as a DVD, a device and a method for peeling a dummy disk or a stamper from a substrate have been developed (see Jpn. Pat. Appln. KOKAI Publication No. 2001-52378, and Jpn. Pat. Appln. KOKAI Publication No. 2007-118552). In the case of manufacturing an optical disk, a gap between the substrate and the dummy disk or the stamper is about several µm, and the dummy disk or the stamper has only to be peeled off from only one surface of the substrate, and hence the work can be performed with relative ease.

However, it is difficult to apply the conventional device to the operation for peeling stampers from both sides of the substrate under the conditions that the resist between the substrate and the stampers have a small thickness of 1 µm or less as in the case of manufacturing a DTR medium.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIGS. 1A and 1B are a cross-sectional view and a plan view illustrating a state where an imprinted structure is set on a peeling device;

FIGS. 2A and 2B are a cross-sectional view and a plan view illustrating a state where an imprinted structure is set on a peeling device;

FIGS. 4A to 4D are cross-sectional views showing a method of peeling off a stamper in a second embodiment of the present invention.

DETAILED DESCRIPTION

Figure 3A:
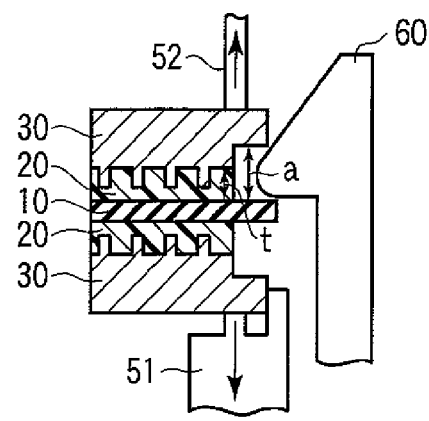
FIGS. 3A to 3D are cross-sectional views showing a method of peeling off a stamper in a first embodiment of the present invention.

Various embodiments of the invention will be described hereinafter with reference to the accompanying drawings. In general, according to one embodiment of the invention, there is provided an imprinting method comprising; applying a resist to a substrate; imprinting a stamper on which protruded patterns are formed against the resist applied to the substrate; forcing a distal end of a peeling wedge into a part between the substrate and the stamper; and introducing a gas between the substrate and the stamper to peel off the stamper from the substrate, wherein a gap between the substrate and the stamper is made larger than a thickness of the resist at a part into which the distal end of the peeling wedge is forced.

In the following embodiments, a case where an annular substrate and annular stampers are used, and a peeling wedge is arranged in the central hole, and the substrate and the stamper are peeled from each other in the inner periphery will be described.

First Embodiment

In a first embodiment, a stamper on which a step is provided by making a thickness of the inner periphery thinner than the other part is used.

FIG. 1A is a cross-sectional view illustrating a state where an imprinted structure is set on a peeling device, and FIG. 1B is a plan view.

With reference to FIG. 1A, a state where a structure in which a resist applied to each of both sides of a substrate is imprinted with two stampers is set on a peeling device will be described below. A resist 20 is applied to each of both sides of the substrate 10. Two stampers 30 in which protruded patterns are formed on the surface thereof and a step is provided by making a thickness of an inner periphery thinner than the other part are prepared. The protruded pattern surface of each of the two stampers 30 is pressed against the resist 20 applied to each of both sides of the substrate 10 from above and below.

This structure is set on the peeling device, and the lower part and the upper part of the inner periphery of the structure are held with vacuum chucks 51 and 52. In this state, the peeling wedge 60 is arranged in the central hole of the structure, and the peeling wedge is positioned in such a manner that a distal end of the peeling wedge is positioned at a height between the substrate 10 and the upper stamper 30. As shown in FIG. 1B, the peeling wedge 60 constitutes a four-segment body.

FIGS. 2A and 2B are views corresponding to FIGS. 1A and 1B, respectively. As shown in FIGS. 2A and 2B, the four peeling wedges 60 are moved from the center toward the outside, whereby the distal end of each of the peeling wedges 60 is forced into a gap between the substrate 10 and the upper stamper 30.

A method of peeling the stampers from the substrate will be described below with reference to FIGS. 3A to 3D. In each of FIGS. 3A to 3D, only the left side of the imprinted structure viewed from the central hole is shown.

As shown in FIG. 3A, a step is formed by making the thickness of the stamper 30 in the inner periphery thereof small, and hence a gap 'a' between the substrate 10 and the stamper 30 is larger than a thickness 't' of the resist 20 applied to the substrate 10 in the inner periphery of the stamper 30. Since the thickness 't' of the resist 20 is 1 μm or less, the gap 'a' between the substrate 10 and the stamper 30 is made to be 1 μm or more. In this way, the distal end of the peeling wedge 60 can be forced into the gap between the substrate 10 and the stamper 30 even when a curvature of the distal end of the peeling wedge 60 is larger than 1/t.

Figure 3B:
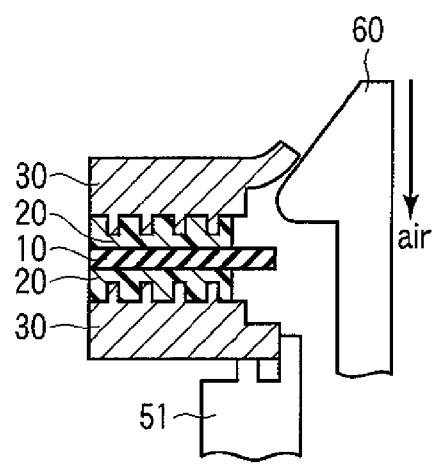

As shown in FIG. 3B, the peeling wedge 60 is moved upwardly, and a part of the stamper 30 is mechanically peeled from the substrate 10. In this state, compressed air is supplied from the center of the four peeling wedges 60, and the compressed air is passed through between the substrate 10 and the stamper 30, thereby peeling the upper stamper 30 from the substrate 10.

Figure 3C:
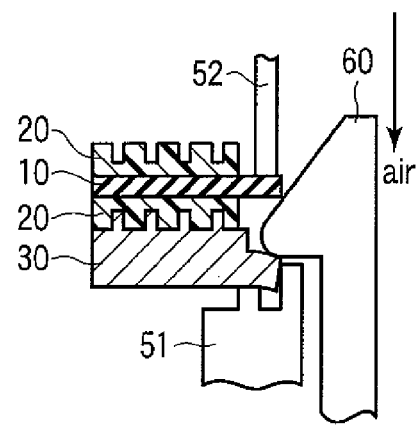

As shown in FIG. 3C, after the upper stamper 30 is peeled off, an upper part of the inner periphery of the substrate 10 is held with a vacuum chuck 52. At this time, the substrate 10 is held with the vacuum chuck 52 at a position on the substrate where no pattern is formed. More specifically, the vacuum chuck 52 is brought into contact with the top surface of the substrate 10 at a position within 3 mm from the inner periphery of the substrate 10. Then, the peeling wedge 60 is moved downwardly to mechanically peel a part of the stamper 30 from the substrate 10. In this state, compresses air is supplied from the center of the four peeling wedges 60, and the compressed air is passed through between the substrate 10 and the stamper 30, thereby peeling the lower stamper 30 from the substrate 10.

Figure 3D:
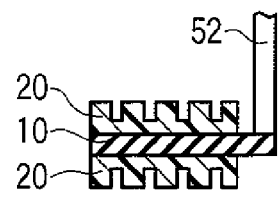

In this way, as shown in FIG. 3D, it is possible to satisfactorily peel off the upper and lower stampers 30 from the substrate 10, and obtain patterns having satisfactory shapes on the entire surface.

It should be noted that the peeling wedge 60 may be forced into the imprinted structure from the outer periphery of the structure to peel off the stamper 30. In this case too, in the step corresponding to FIG. 3C, the vacuum chuck 52 is brought into contact with the top surface of the substrate 10 at a position within 3 mm from the outer periphery of the substrate 10 so that the substrate 10 can be held with the vacuum chuck 52 at a position on the substrate where no pattern is formed.

Peeling the stampers was tried for comparison under the same conditions as in FIGS. 3A to 3D except that a flat stamper on which no step is provided in the inner periphery is used. However, the stampers could not be peel off from the substrate.

Second Embodiment

In a second embodiment, a thickness of a resist to be applied to a substrate is made larger only in an inner periphery of the substrate. By adjusting the condition of spin coating, a thickness of the resist applied to the substrate can be made larger only in a part thereof.

As shown in FIG. 4A, the thickness of the resist to be applied to the substrate 10 is made larger only in the inner periphery of the substrate, and hence, in the inner periphery, a gap 'a' between the substrate 10 and the stamper 30 is larger than the thickness 't' of the resist applied to the central part of the substrate 10. In this way, the distal end of the peeling wedge 60 can be forced into the gap between the substrate 10 and the stamper 30.

As shown in FIG. 4B, the peeling wedge 60 is moved upwardly, and a part of the stamper 30 is mechanically peeled from the substrate 10. In this state, compressed air is supplied from the center of the four peeling wedges 60, and the compressed air is passed through between the substrate 10 and the stamper 30, thereby peeling the upper stamper 30 from the substrate 10.

As shown in FIG. 4C, after the upper stamper 30 is peeled off, an upper part of the inner periphery of the substrate 10 is held with a vacuum chuck 52. Then, the peeling wedge 60 is moved downwardly to mechanically peel a part of the stamper 30 from the substrate 10. In this state, compressed air is supplied from the center of the four peeling wedges 60, and the compressed air is passed through between the substrate 10 and the stamper 30, thereby peeling the lower stamper 30 from the substrate 10.

In this way, as shown in FIG. 4D, it is possible to satisfactorily peel off the upper and lower stampers 30 from the substrate 10, and obtain patterns having satisfactory shapes on the entire surface.

It should be noted that in the present invention, it may be made easier to force the distal end of the peeling wedge 60 into the gap between the substrate 10 and each of the stampers 30 by warping the inner periphery of each of the upper and lower stampers upwardly or downwardly.

As described above, by using the method of the present invention, it is possible to peel off the stampers from the imprinted structure, and uniformly transcribe micropatterns onto both sides of the substrate. The method of the present invention is not limited to the case where the substrate and the stampers having the annular shape are used, and can be applied to a substrate and stampers having any shape.

Next, a method of manufacturing a DTR medium using the imprinting method will be schematically described below with reference to FIGS. 5A to 5F.

Figure 5A:
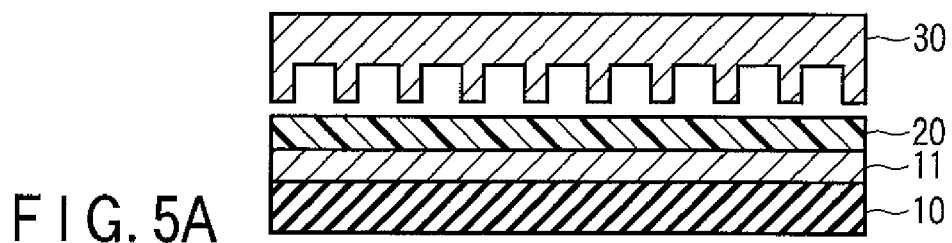
FIGS. 5A to 5F are cross-sectional views showing a method of manufacturing a DTR medium.

As shown in FIG. 5A, a magnetic film 11 is deposited on a surface of a substrate 10, and the magnetic film 11 is coated with a resist 20. A stamper 30 on which protruded patterns are formed is arranged to be opposed to the resist 20.

Figure 5B:
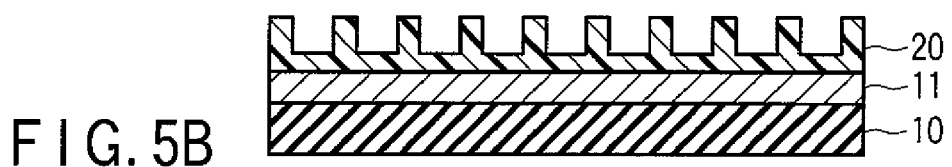

As shown in FIG. 5B, the stamper 30 is pressed against the resist 20, and then the stamper 30 is removed, thereby transcribing the patterns onto the resist 20. This step corresponds to the steps of FIGS. 3A to 3D or the steps of FIGS. 4A to 4D.

Figure 5C:
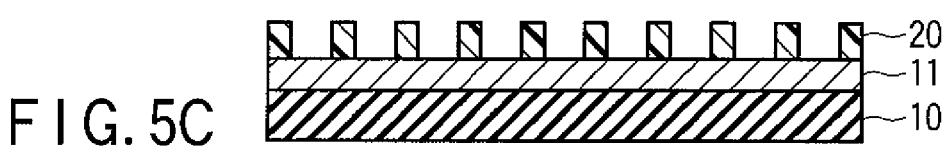

As shown in FIG. 5C, the resist residues remaining on the bottoms in the recesses between the resist patterns are removed by which the magnetic film 11 is exposed.

Figure 5D:
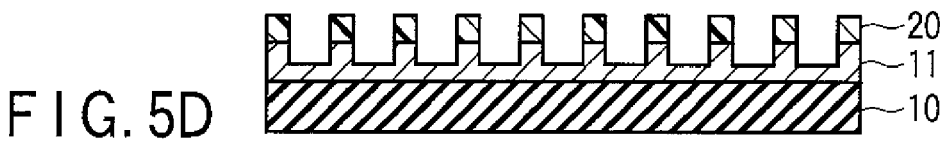

As shown in FIG. 5D, the magnetic film 11 is etched by using the resist pattern as a mask, whereby discrete tracks and the like formed of protruded magnetic patterns are formed.

Figure 5E:
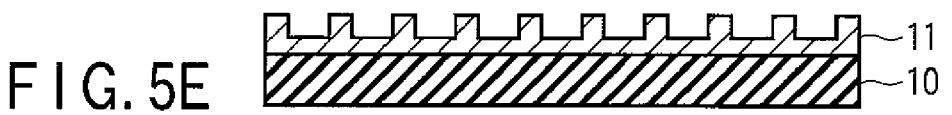

As shown in FIG. 5E, the remaining resist 20 is removed.

Figure 5F:
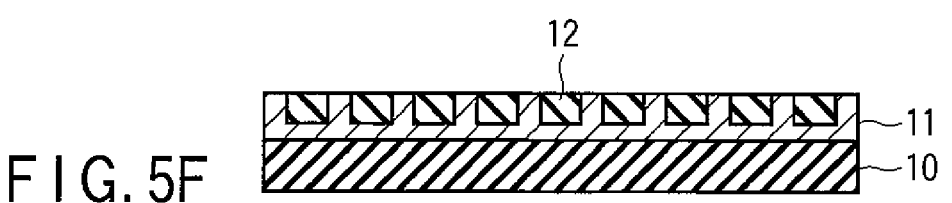

As shown in FIG. 5F, the recesses between the protruded magnetic patterns are filled with a non-magnetic material 12, and then the surface thereof is subjected to etch-back for planarizing.

Then, a carbon protective film is deposited, and a lubricant is applied to manufacture a DTR medium.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An imprinting method comprising:
   applying a resist to both sides of a substrate;
   imprinting two stampers comprising protruded patterns against the resist applied to both sides of the substrate;
   forcing a distal end of a peeling wedge inbetween the substrate and each stamper; and
   introducing a gas between the substrate and each stamper in order to peel off each stamper from the substrate,
   wherein a gap between the substrate and each stamper is larger than a thickness of the resist at a position where the distal end of the peeling wedge is forced,
   the distal end of the peeling wedge is forced into the gap between the substrate and one stamper, in a state that the two stampers are held with vacuum chucks at positions on an inner periphery or an outer periphery of the substrate where no pattern is formed, in order to peel off one stamper, and
   the distal end of the peeling wedge is forced into the gap between the substrate and the other stamper, in a state that the stamper and the other stamper are held with vacuum chucks, in order to peel off the other stamper.

* * * * *